No. 610,858. Patented Sept. 13, 1898.
W. H. DANNAT.
POTATO PLANTER.
(Application filed July 23, 1897.)
(No Model.) 2 Sheets—Sheet 1.

Witnesses
Lee J. Van Horn.
Victor J. Evans.

Inventor
Willard H. Dannat,
by John Wedderburn
Attorney

No. 610,858. Patented Sept. 13, 1898.
W. H. DANNAT.
POTATO PLANTER.
(Application filed July 23, 1897.)

(No Model.) 2 Sheets—Sheet 2.

Witnesses
Lee J. Van Horn
Victor J. Evans

Inventor
Willard H. Dannat
by John Wedderburn
Attorney

UNITED STATES PATENT OFFICE.

WILLARD H. DANNAT, OF GREAT FALLS, MONTANA.

POTATO-PLANTER.

SPECIFICATION forming part of Letters Patent No. 610,858, dated September 13, 1898.

Application filed July 23, 1897. Serial No. 645,646. (No model.)

*To all whom it may concern:*

Be it known that I, WILLARD H. DANNAT, of Great Falls, in the county of Cascade and State of Montana, have invented certain new and useful Improvements in Potato-Planters; and I do hereby declare the following to be a full, clear, and exact description of the invention, such as will enable others skilled in the art to which it appertains to make and use the same.

The object of this invention is to provide a machine for planting potatoes in which the parts are constructed and arranged with a view to simplicity and cheapness and also with a view of having the potatoes planted within the ground to the proper depth.

The invention also contemplates an arrangement in which the planting mechanism can be quickly thrown out of operation for the purpose of transporting the machine or making a turn.

To the above ends the invention consists in the novel construction of certain detail parts and their combination with other instrumentalities to form a simple, cheap, and effective potato-planter.

The following specification gives a full description of the invention, and what is considered to be patentable is particularly set forth in the appended claims.

Figure 1:
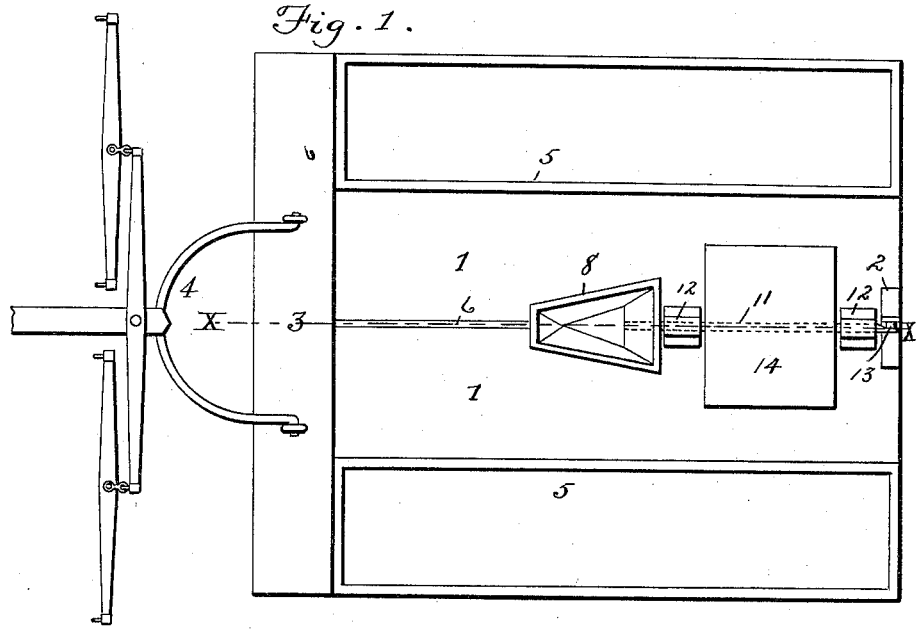
Figure 2:
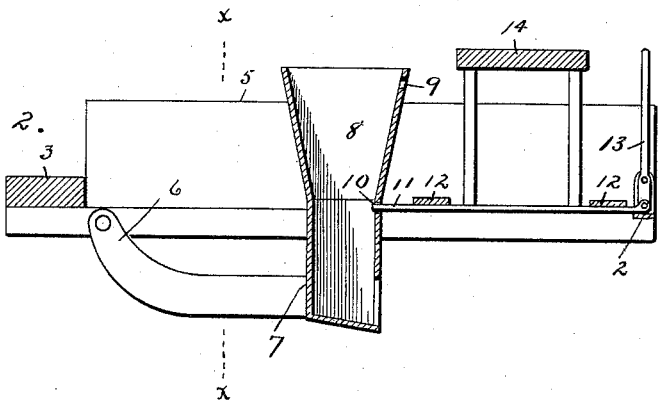
Figure 3:
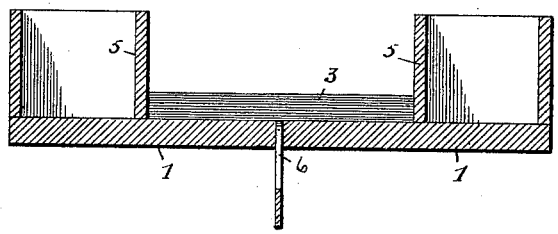
Figure 4:
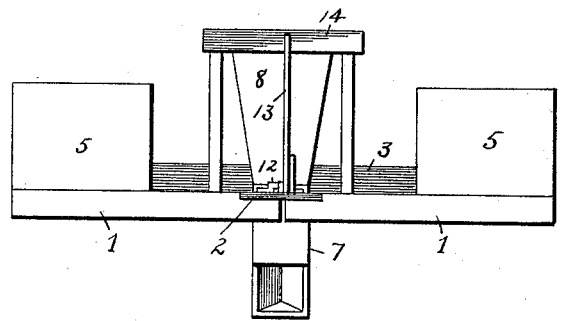

In the accompanying drawings, forming part of this specification, and wherein like numerals of reference refer to similar parts throughout the several views, Figure 1 is a plan view of a potato-planter constructed in accordance with my invention. Fig. 2 is a longitudinal vertical section on the line $x\ x$ of Fig. 1. Fig. 3 is a transverse sectional view. Fig. 4 is a rear elevation.

In making up my improved potato-planter I employ two horizontal platforms 1 1, which are connected to each other at their rear ends by a plate 2, while at their forward ends is a transverse beam 3, rigidly secured thereto and forming the means by which the draft attachment 4 of the ordinary construction is applied. These parts constitute the main frame of the machine, which may or may not be supported by wheels.

Upon the platforms which make up the frame to be located at the sides of the machine are boxes 5 5, in which the potatoes are placed and taken out as they are planted. As hereinbefore mentioned, the platforms leave a space between the same, and in this space is mounted a runner or shoe 6, the heel 7 of which is extended upward and carries a hopper 8. The said heel forms practically a chute leading from the hopper and is open at its rear end to allow the potatoes to fall into the furrow made by the runner or shoe. The upper part of the hopper is provided with a recess 9, forming a handhold by which the rear end of the runner or shoe can be elevated out of contact with the ground, a second recess 10 being provided, with which engages a sliding bar 11, designed to hold the shoe 6 in the ground, and it is mounted within metal strips 12 12, which also serve to connect the platforms of the machine, a lever 13 being connected to the rear end of the rod and extending upward therefrom. The dropper's seat 14 is mounted between the hopper and the lever, hereinbefore described. It will be understood that the forward end of the runner or shoe is pivoted between the platforms forming a part of the frame of the machine, and when the rear end is raised, carrying the hopper with it, the lever is manipulated to move the sliding rod forward, so that the heel of the shoe shall rest on it and hold said shoe out of operative position.

From the foregoing description, in connection with the accompanying drawings, the construction and operation of my improved potato-planter will be readily apparent, for the seedlings which are carried within the boxes 5 5 are taken out and deposited into the hopper, from which they pass into the furrow made by the runner or shoe, the driver's seat being so located that the operator can conveniently remove the potatoes from either or both boxes. In transporting the machine or turning to plant another line the rear end of the shoe is elevated and held by the sliding rod in the manner hereinbefore described.

Having thus described my invention, what I claim as new, and desire to secure by Letters Patent, is—

1. In a potato-planter, the combination with the main frame comprising platforms connected to each other to leave an intervening space at the forward end, a runner or shoe located between the platforms and pivoted at its forward end, a hopper located on the rear end of the shoe and communicating with an opening therein, a sliding rod engaging the hopper to hold the shoe out of contact with the ground, and a seat mounted upon the frame, substantially as described.

2. In a potato-planter, the combination of the platforms forming the frame and separated to present an intervening space, a runner or shoe pivoted within said space at its forward end, a hopper mounted upon the rear end of the shoe and communicating with a vertical opening through the same, a sliding rod engaging a recess in the hopper or shoe, and a lever for operating the rod; together with boxes located at opposite sides of the machine, and a seat between the boxes and in rear of the hopper, the parts being constructed and organized, substantially as herein shown and described.

In testimony whereof I have signed this specification in the presence of two subscribing witnesses.

WILLARD H. DANNAT.

Witnesses:
W. M. DANNAT,
E. W. KING.